(12) United States Patent
Nakatsuyama

(10) Patent No.: US 6,658,062 B1
(45) Date of Patent: Dec. 2, 2003

(54) USER-DEMAND INFORMATION AND ENTERTAINMENT SYSTEM USING WIDE AREA DIGITAL BROADCAST

(75) Inventor: Takashi Nakatsuyama, La Jolla, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/568,788

(22) Filed: May 9, 2000

(51) Int. Cl.⁷ .............................................. H04L 27/00
(52) U.S. Cl. ...................................................... 375/259
(58) Field of Search ................................ 375/259, 316, 375/219, 295; 455/222, 185.1; 348/569, 570, 552; 725/570, 39, 38, 52

(56) References Cited

U.S. PATENT DOCUMENTS

| | | | | |
|---|---|---|---|---|
| 5,406,626 A | | 4/1995 | Ryan ............................ | 380/9 |
| 5,786,869 A | * | 7/1998 | Baek et al. .................. | 348/565 |
| 6,175,362 B1 | * | 1/2001 | Harms et al. ............... | 345/721 |
| 6,426,779 B1 | * | 7/2002 | Noguchi et al. ............ | 348/569 |
| 6,470,497 B1 | * | 10/2002 | Ellis et al. .................... | 725/39 |

* cited by examiner

*Primary Examiner*—Khai Tran

(57) ABSTRACT

An information system provides selected information to individual users. A high speed digital program signal is broadcast and contains program data that begins at a reference time and is repeated at set intervals. A separate index signal contains a receiver identifier, reference time, program interval information, and program signal tuning information. The user's receiver monitors the index signal. When the receiver detects the correct identifier, the receiver downloads and stores the reference time and tuning information. The receiver then uses the stored reference time and tuning information to receive, download, store, and output the user's selected program. In some embodiments a transceiver replaces the receiver to allow the user to make program requests. Program requests are relayed to a service center using a conventional wireless communications system.

29 Claims, 10 Drawing Sheets

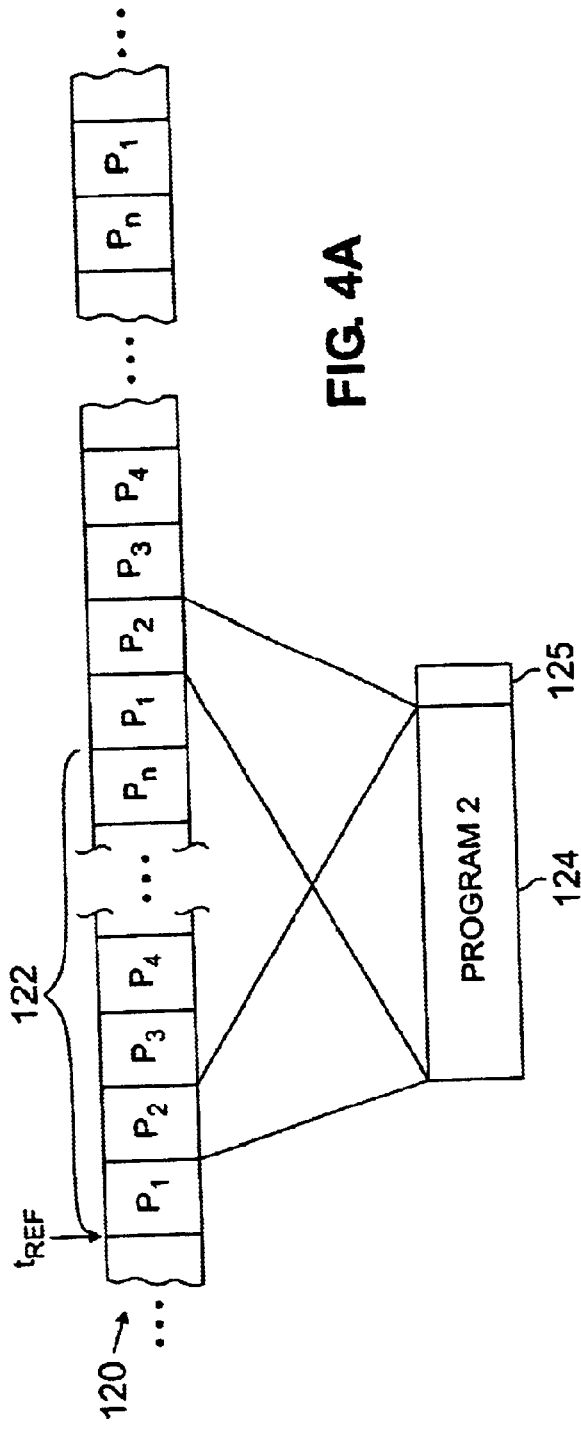
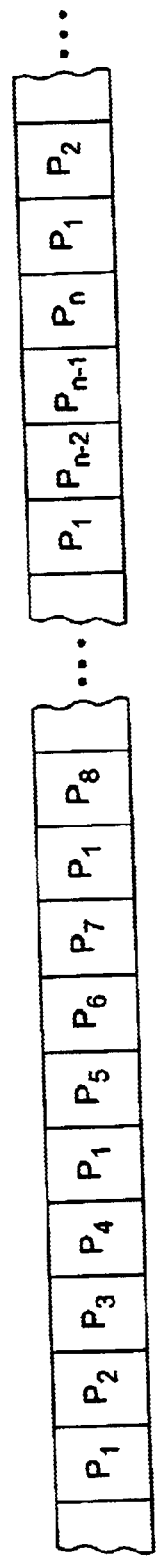
FIG. 4A
FIG. 4B

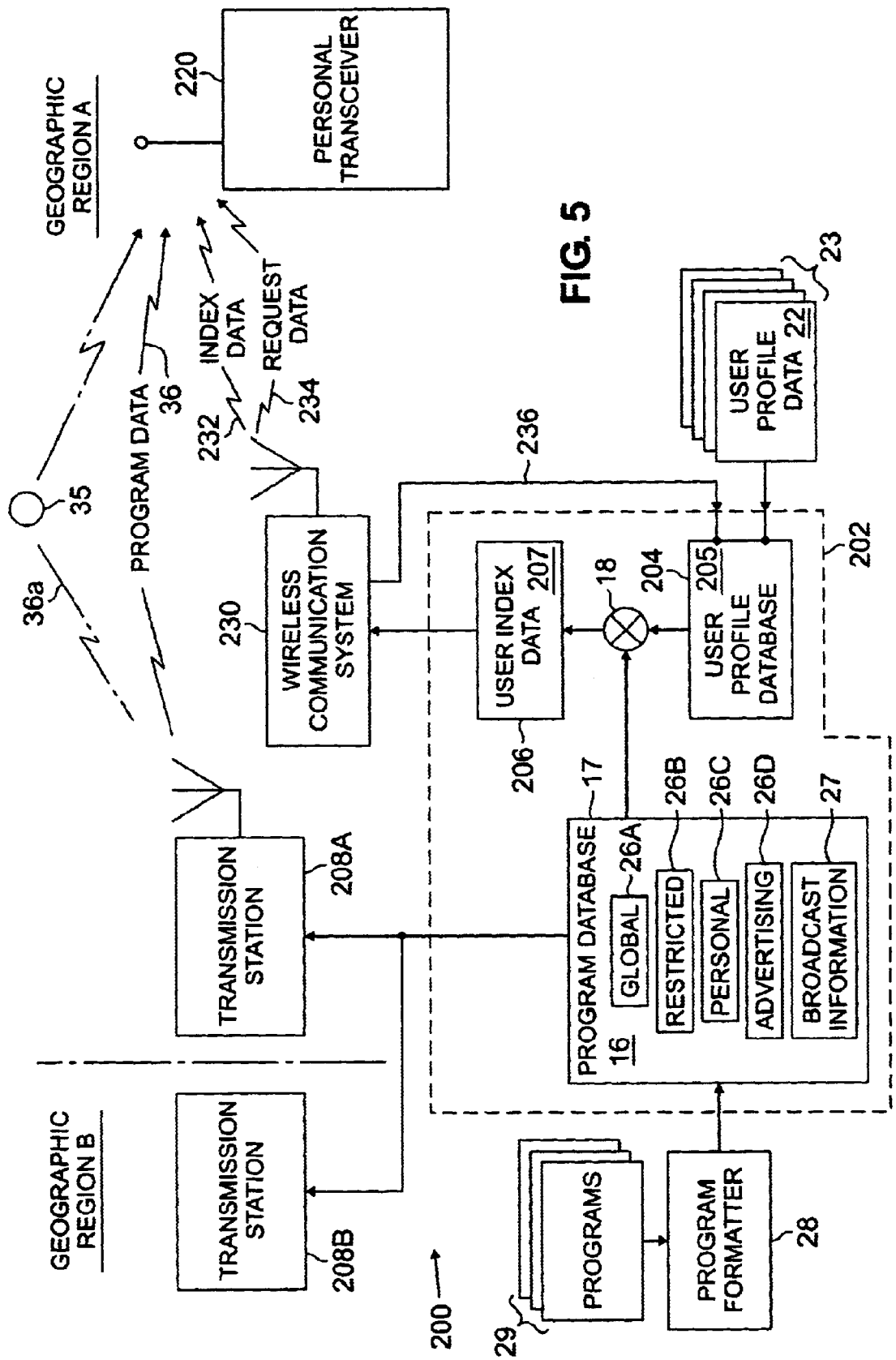

USER-DEMAND INFORMATION AND ENTERTAINMENT SYSTEM USING WIDE AREA DIGITAL BROADCAST

RELATED APPLICATION

This application is filed concurrently with U.S. patent application Ser. No. 09/566,911 by Takashi Nakatsuyama entitled "Receiver for User-Demand Information and Entertainment System Using Wide Area Digital Broadcast" which is incorporated herein by reference.

BACKGROUND

1. Field of Invention

The present invention relates to broadcast systems and in particular to broadcast systems in which a user designates particular information to be received.

2. Related Art

There is a growing demand for systems that deliver information and entertainment that is tailored to an individual user's (system subscriber) preferences. Current information and entertainment delivery systems servicing many end system users (e.g., "The Internet" having an origin in the network of interconnected networks developed under the Advanced Research Projects Agency) offer a variety of information services. End systems (e.g., personal computer) are typically at fixed locations and are physically connected (wired) to the information delivery system.

Wireless (e.g., radio) systems have been implemented to allow users access to information while mobile. Two-way high-speed network connections have been implemented in wide bandwidth wireless communications systems (e.g., Wideband Code Division Multiple Access (W-CDMA)) to allow users to access information. Such wireless systems typically operate in limited geographic areas. Expanding such systems to cover larger areas causes network traffic problems due to the large number of users who require service. Furthermore, special services directed to each user increases the price of service to each wireless system user.

Other wireless broadcast systems that are implemented over wider geographic areas offer one-way service (e.g., Digital Audio Broadcasting (DAB), XM satellite radio by XM SATELLITE RADIO INC.), but do not allow information delivery that is tailored to each user's requests. Such systems therefor limit each user's ability to select only information that he or she desires. For example, if a user wants to listen to two radio programs, the programs must be broadcast at separate times (either on the same or different channels). As the number of programs and broadcast channels increase, the user's choices become more restricted. Several systems overcome this problem by storing (e.g., on a disk drive) broadcast programs and therefore allow users to "time shift" programs.

Some systems send program guides (e.g., television electronic program guide (EPG)) that allow users to tune to receive desired information on a particular channel at a particular time. Such guides, which cover all programs, are content limited and do not contain detailed information. And, one-way service does not allow the user to access information in real- or near real-time. What is desired is a personal information and entertainment system that allows each individual subscriber to tailor received programs in accordance with individual preference, and that can support a large number of users over a wide geographic area. It is also desirable to allow system subscribers to change their individual program requests in real or near real time.

SUMMARY

A broadcast information system in accordance with the invention allows the user (system subscriber) to specify the information or programs he or she wants to receive. In some embodiments the broadcast system acts as a "push" system. In other embodiments the system acts as a "push-pull" system. In the "push" embodiments the user has a receiver that receives the user's prerequested programs. In the "push-pull" embodiments, the user has a combined transmitter and receiver (transceiver) that allows the user to request in real time a program or information he or she chooses.

The system includes a database of program information. The program information may include features such as music, news features, sports scores, concert ticket information, etc. Programs are broadcast in compressed format using a high speed digital signal. The program signal is divided into frames and each frame contains data for one program available on the system. Large programs may have data in two or more frames. Each program is broadcast at a unique predetermined time or times so that individual programs may be periodically broadcast. If the number of offered programs is large, more than one program signal is used to reduce the time between repeat broadcasts of the frames. For example, program data for programs 1–10 may be broadcast on one channel, and program data for programs 11–20 may be broadcast on another channel. The user's receiver or transceiver is configured to tune to the appropriate program signal and to download and store the preselected programs. Tuning is accomplished using index data received in a separate signal.

In the "push" embodiments the user preselects one or more program information features the system offers and is given a receiver associated with a unique identifier. The system creates index data for the user by associating the user's preselected programs with the receiver's identifier. This association identifies the appropriate program signal channel and the broadcast time for each preselected program. The system then continuously broadcasts the user's index data in an index signal that also includes index data for many other system users. The index signal is divided into frames, and each system user's index data is broadcast in a separate frame. The frame begins with the identifier assigned to the user's receiver, and the receiver monitors the index data signal for its identifier. When the receiver detects its identifier, the receiver downloads and stores the particular user's index data that follows in the frame. Then, using the index data, the receiver tunes to the correct program signal channel at the correct time and downloads the program data frame(s) associated with the user's preselected program. The receiver decompresses the program data and outputs the program to the user.

"Push-pull" embodiments of the invention allow the user to select one or more frames from the program signal in real- or near real time. The user selects one or more programs by using the transceiver to send a request signal to a wireless (radio) communication system. The user's request is relayed to the system service center which, in turn, creates and sends index data information directly back to the transceiver. Thus some "push-pull" embodiments may omit the continuously broadcast index data signal. Once the transceiver receives the index data associated with the user's immediate request, the transceiver tunes to the correct program data channel at the correct time and downloads the user's requested program.

In some embodiments the system offers global, restricted, and personal programs. Global programs, such as music, news, sports scores, etc., are available to all users at any time. However, the user must have additional authorization to access restricted programs such as special concerts or other high value entertainment. Some embodiments encrypt restricted program data and include the necessary decryption key in the user's index data when the user pays an additional fee. Personal programs are dedicated to one or more particular users. In embodiments using the transceiver, the user may receive global concert ticket information and an electronic "order form". The user selects a concert and sends to the service center a ticket order along with an electronic payment. The service center responds with a confirmation.

The system is designed to operate over a large geographic area. In many cases the program data signals must be broadcast over different channels in different geographic regions due to the broadcast spectra available in each region. In some embodiments, however, this condition is transparent to the user because the index signal broadcast in each region contains the necessary program signal tuning information for the region.

BRIEF DESCRIPTION OF THE DRAWINGS

FIGS. 4A, 4B, and 4C are diagrams showing program signal structures.

FIG. 5 is a block diagram illustrating a second system embodiment.

DETAILED DESCRIPTION

Figure 1:
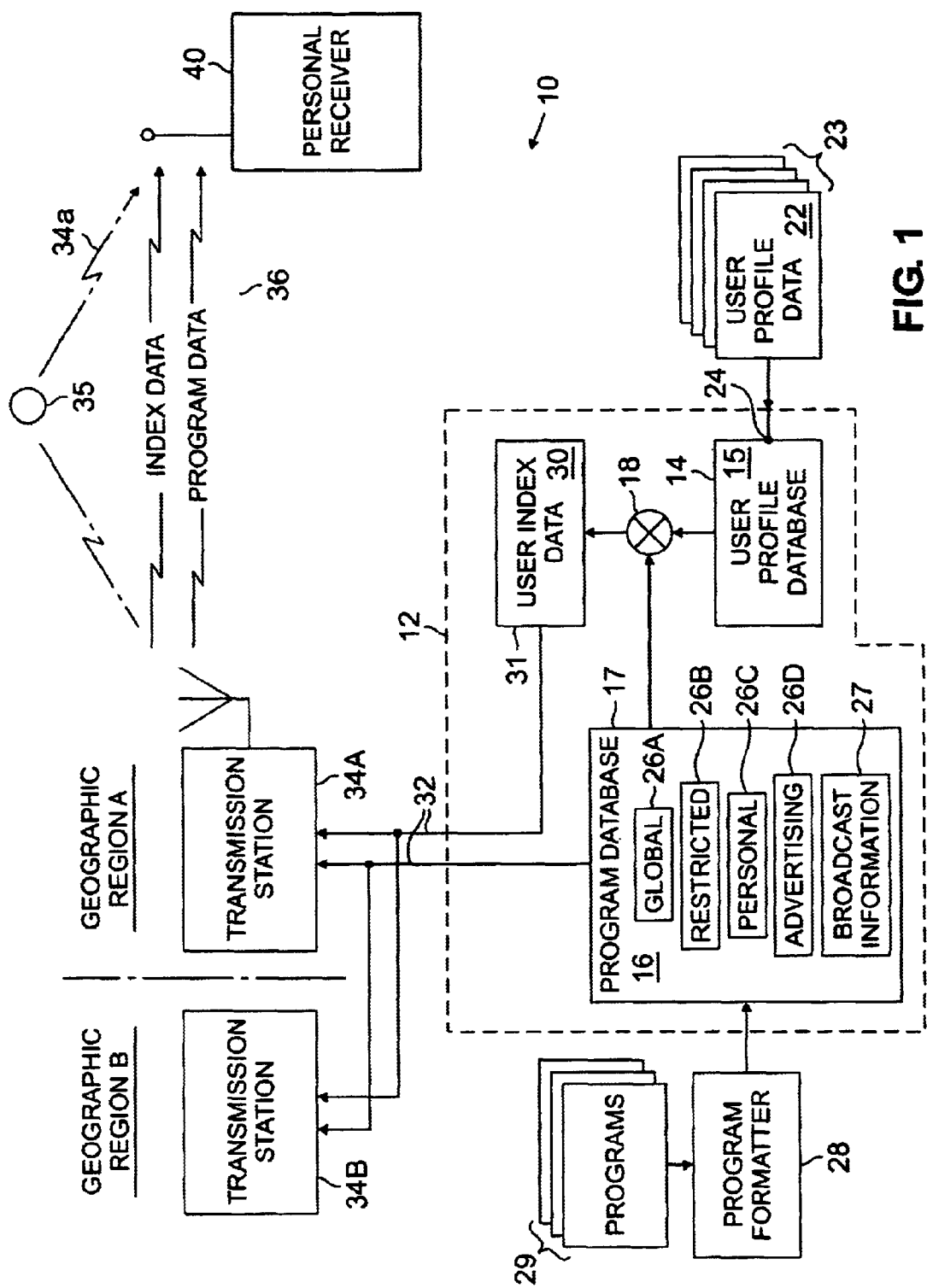
FIG. 1 is a block diagram illustrating a first system embodiment.

Throughout this specification the terms "channel" and "signal" are used. Persons skilled in the art will understand that "channel" and "signal" each should be broadly interpreted. "Channel" includes, for example, a specific frequency or frequency range, a time or frequency division multiplexing assignment, or a spread spectrum coding channel. "Signal" includes, for example, information carrying phenomena such as a radio frequency transmission, a conventional telephone line transmission, or an optical pipe transmission. Persons skilled in the art will also understand that the various signal data structures shown and described include conventional header, trailer, and overhead information that has been omitted so as to more clearly describe the present invention. Elements in the drawings having identical numbers represent the same or substantially similar features.
Push System FIG. 1 is a block diagram illustrating broadcast information system 10. As shown, service center 12 includes user profile database memory 14, program database memory 16, mixer 18, and user index data memory 20.

User profile database memory 14 is conventional and contains a database of program request information associated with each system user (e.g., subscriber to a commercial service). As described below, each user has one or more receiver devices and each receiver device includes a unique device identifier. The device identifier is assigned, for example, during unit manufacturing or when the user subscribes to the broadcast service.

Each user preselects one or more programs the service provider broadcasts over the system. The unique receiver identifier and the user's program requests are combined as user profile data 22 for each user. Multiple profiles 23 are transferred to and stored in memory 14 as the user profile database 15. Thus database 15 includes the identifier associated with each user's receiver and the program selections associated with each receiver's identifier. Service providers may use various database architectures, including relational and hierarchical. User profile data 22 may include other information such as demographic information, also stored in database 15.

Individual profile data 22 is transferred to user profile database memory 14 through terminal 24. Data 22 may be transferred using any conventional communications system such as land line, electronic mail, wireless network, or ground mail and manual data entry.

Program database 16 is stored in conventional memory 17 and contains digitized program information for each program available on the system. Program content includes both entertainment and information. For example, program content may include music, financial news, sports scores, concert ticket information, television schedules, etc., and any information available through The Internet. In some embodiments the service provider may offer content that is received on one or more particular receiver unit types. For example, audio program content may be received and output to the user on one type of receiver unit, and audio plus text-and graphics content may be received and output to the user on a second type of receiver unit. When two or more receiver unit types are offered, each receiver unit has a unique device identifier. If a single user possesses two or more units, the device identifiers for each of these units are associated with the single user. In this way the service provider can tailor content delivery not only to the individual user, but to the user's specific device that can output the particular content. The types of receiver units that the user possesses are part of the user profile, and this information may be updated as necessary.

Program information in database 16 is divided into several types. As shown, for example, database 16 includes global programs 26A, restricted programs 26B, personal programs 26C, and advertising programs 26D. Some embodiments may add to or omit these program categories. Global programs 26A are available to all system users on request and include, for example, music compilations, news, sports scores, etc. Restricted (restricted multicast) programs 26B are programs available to only selected system users. Restricted programs may include high value entertainment, such as a special concert performance, for which a user pays an additional fee. In some embodiments the restricted program is subject to conditional access (e.g., encrypted and the user receives the necessary decryption key upon fee payment). Personal (personal multicast) programs 26C are programs available to selected system users (including in some embodiments only one user) but are not subject to conditional access (e.g., selected Internet usenet newsgroups or electronic "bulletin boards" with classified advertisements). Advertising programs 26D are commercial advertisements. In some instances specific commercial advertisements are associated with selected global, restricted, or personal programs, or with user profile data 22, so as to "target" system users choosing the specific program. The targeting may be based on facts such as the user's preselected programs, or on the user's demographic information.

Program database memory 16 also includes stored broadcast information 27 that is associated with each system program. As described in more detail below, this broadcast information includes the channels and times at which each program is broadcast in particular system 10 geographic regions.

Program formatter 28 is conventional and digitally formats program information 29 for each program to be included in database 16. In some embodiments formatter 28 operates in real time to ensure the most current program information is available on the system. Real time updates include programs such as news, financial information (e.g., stock prices), or personal programs. In some embodiments music programs (e.g., the current month's ten most popular jazz songs) are a significant portion of the program content. A large number of personal programs requires a large fraction of available bandwidth. Programs may be stored and broadcast in one or more compressed data formats.

Embodiments may allow the user to access some programs as "foreground" tasks and other programs as "background" tasks. For example, in some embodiments music is a "foreground" program and is the program information output to the user without the user taking further action. That is, when the user turns on his or her receiver, the foreground program stored in memory is output without the user taking further action. When the user has designated one or more preselected programs as foreground programs, other preselected programs are background programs. The user must take some action to access these background programs. For example, if music is a foreground program, other programs such as news, financial information, or personal programs are background programs. Thus if the user has requested the monthly top 10 jazz songs as the foreground task, for example, the user will hear this jazz program continuously played upon turning on the receiver. The user must make a selection on his or her receiver to access news or electronic mail as a background program. In some embodiments there is no distinction between foreground and background programs.

Email and other personally directed information may be integrated into push embodiments, although real time access is lost. But in addition, considerable program data signal broadcast bandwidth is sacrificed to information directed to only one specific user at a time. Thus push system embodiments that include email as part of program data contents are inefficient.

Information from user profile database 15 and program database 16 is routed through conventional mixer 18 to create user index data 30 stored in conventional user index data memory 31. Mixer 18 associates the user's receiver identifier and program requests from profile 22 with the channel and time broadcast information for each program stored a broadcast information 27. Thus index data 30 contains information the user's receiver requires to correctly tune, receive, download, and output the user's selected programs. The signal carrying the user index data is described in detail below.

Signals representing information stored in program database 16 (memory 17.) and index data 30 (memory 31) are sent via lines 32 to at least one transmission station 34A. As shown in FIG. 1, transmission station 34A is located in system 10's geographic region A. Likewise, in the embodiment shown in FIG. 1, transmission station 34B is located in geographic region B and also receives information stored in memories 17 and 31. Other embodiments include more transmission stations to provide, for example, nationwide coverage. The geographic regions are defined by the reliable broadcast signal coverage of each transmission station. The transmission stations may directly broadcast to the receivers, or may broadcast to a repeater (e.g., satellite). Satellite is more suitable for transmitting the index data signal over wide areas.

User index data from memory 20 is broadcast (one-to-many) as a high speed (e.g., 192 Kilobits/second (Kbps) or greater which is illustrative of one DAB channel transmitting for MP3 formatted audio, digital television signal data rates, etc.) digital index data signal 34. In some embodiments signal 34 is broadcast within a system geographic region on more than one channel and at 192 Kbps per channel. Index channels may vary among system geographic regions. Alternatively, the index data signal may be broadcast over the entire system coverage area (e.g., regions A and B) using a wide area transmission such as index data signal 34a relayed through satellite 35. In some embodiments the satellite signal is further relayed by one or more terrestrial stations (not shown).

Program data from memory 20 is broadcast as high speed digital program data signal 36. Since this system uses a broadcast signal to relay information to users, the data transfer rate (bandwidth) of the broadcast signal is unaffected by the number of users, in contrast to one-to-one systems in which multiple users share available bandwidth.

In some embodiments signal 36 is broadcast on only one program channel within each geographic region. In other embodiments signal 36 includes several component signals, each broadcast on separate program channels within a geographic region. Using multiple channels allows a greater number of programs to be broadcast in a shorter time and/or shortens the time between repeat broadcasts of each program. For example, within geographic region A, some program data is broadcast on one channel and other program data is broadcast on another channel. The program channel data structure is also described in detail below.

Figure 2:
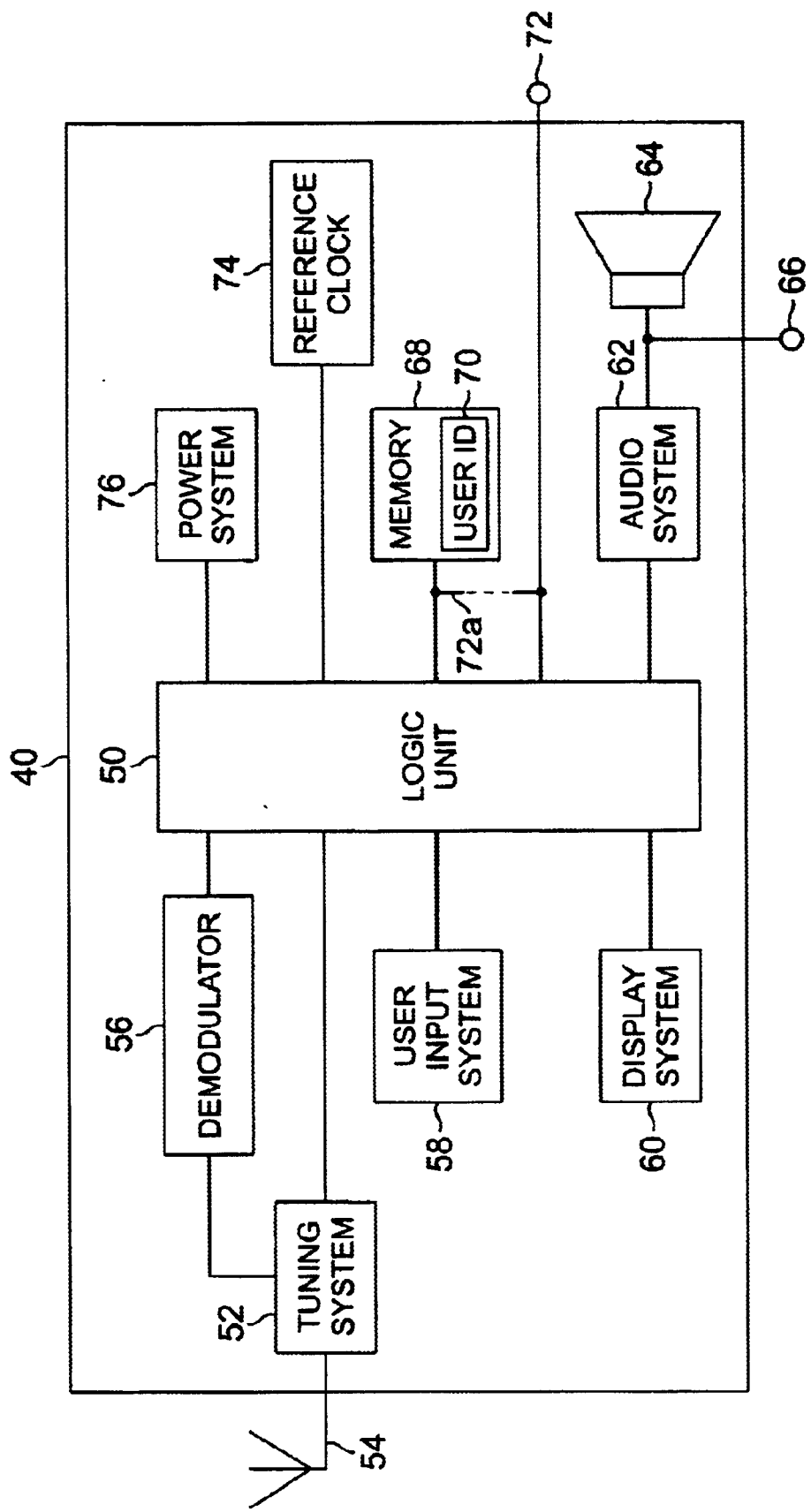
FIG. 2 is a block diagram showing major systems of a receiver.

Information system 10 also includes personal receiver 40. FIG. 2 is a block diagram illustrating major receiver 40 components. Persons skilled in communications will understand the detailed operation of the receiver 40 systems as shown. In some embodiments receiver 40 is configured as a multiple channel receiver that is small and light enough to be easily carried by a single user. In other embodiments receiver 40 may be made part of a larger system, such as an automobile radio.

As shown, logic unit 50 includes a conventional microprocessor/microcontroller that processes and directs information flow within receiver 40 as implemented by coded instructions (e.g., software stored in memory). Tuning system 52 is electrically coupled with both antenna 54 and logic unit 50. Logic unit 50 uses tuning information, described below, to direct tuning system 52 to tune to specified channels to receive index data signal 34 and program data signal 36. Demodulator 56 is coupled with both logic unit 50 and tuning system 52. Demodulator 56 extracts program data or index data from a received signal for processing by logic unit 50. In some embodiments demodulator 56 includes decryption capability to decode encrypted program information.

Personal receiver 40 includes user input system 58, display system 60, and audio system 62, each electrically coupled to the logic unit. Input system 58 allows the user to control receiver 40 functions, such as to select between foreground and background programs, as described herein. Input system 58 includes, for example, a conventional data entry keypad. Display system 60 includes conventional visual display technology, such as liquid crystal or thin film transistor display technology, and in some embodiments displays the video and/or text portions of a program to the user. Display system 60 also displays program menu choices the user selects by using input system 58. In some embodiments the menu choices are presented to the user in a manner similar to a conventional page display formatted using hypertext markup language (HTML). Menu choices may include both existing programs and recent program updates. Audio system 62 outputs the audio portion of a program to the user through, for example, speaker 64. In some embodiments the audio portion is also output through headphone terminal 66.

Memory system 68 is electrically coupled with logic unit 50 and includes both conventional nonvolatile and volatile portions (not shown). During receiver operation, memory system 68 contains information extracted from index data signal 34 and program data signal 36. Memory system 68 includes other hard- and soft-coded instructions (e.g., application specific integrated circuit, software) necessary to operate receiver 40 as described. Creating such code is well within the capability of skilled programmers, and many satisfactory variations exist. Memory 68 also includes portion 70 in which the unique identifier (user ID) is stored. In some embodiments the unique identifier is written into the receiver memory during manufacturing. In other embodiments the identifier is assigned and stored in the memory when the user subscribes to the service. In some embodiments the identifier includes a time and channel component that identifies the appropriate channel and time to which the receiver tunes to receive the index data associated with the receiver's identifier, thus allowing the receiver to operate in a low power mode when not receiving and processing index or program data.

Additional receiver data input/output may be accomplished using conventional terminal 72. Line 72a connects terminal 72 with memory 68, illustrating that conventional direct memory access (DMA) is provided in some embodiments.

Conventional reference clock 74 is electrically coupled with logic unit 50 and provides the reference timing receiver 40 uses to receive program data signal 36. Reference clock 74 receives an initial system time synchronization signal through terminal 72 when the user first subscribes. In some embodiments reference clock 74 receives an updating system time synchronization signal from either index data signal 34 or program data signal 36. Time synchronization information is discussed below.

Power system 76 includes a conventional regulated electrical power source, e.g., a battery, and provides sufficient power to operate receiver 40.

As mentioned above, both index data signal 34 and program data signal 36 (FIG. 1) are continuously broadcast. As described in detail below, program data signal 36 provides a continuous stream of available program data. Program data for each program is broadcast on a particular channel at a particular time, and is repeated at a particular interval. Index data signal 34 contains the channel and time information personal receiver 40 uses to receive the user's preselected program(s) from program signal 36.

When the user has requested more programs than memory system 68 can store, the receiver must prioritize the programs to store and discard. Several options exist. In some embodiments the receiver does not download any more programs when the memory is full. In other embodiments the receiver overwrites old program data as new programs are received. And in still other embodiments the user selectively deletes stored programs and the receiver downloads new programs to fill the free space. Persons familiar with data storage will be familiar with other prioritization schemes.

Figure 3:
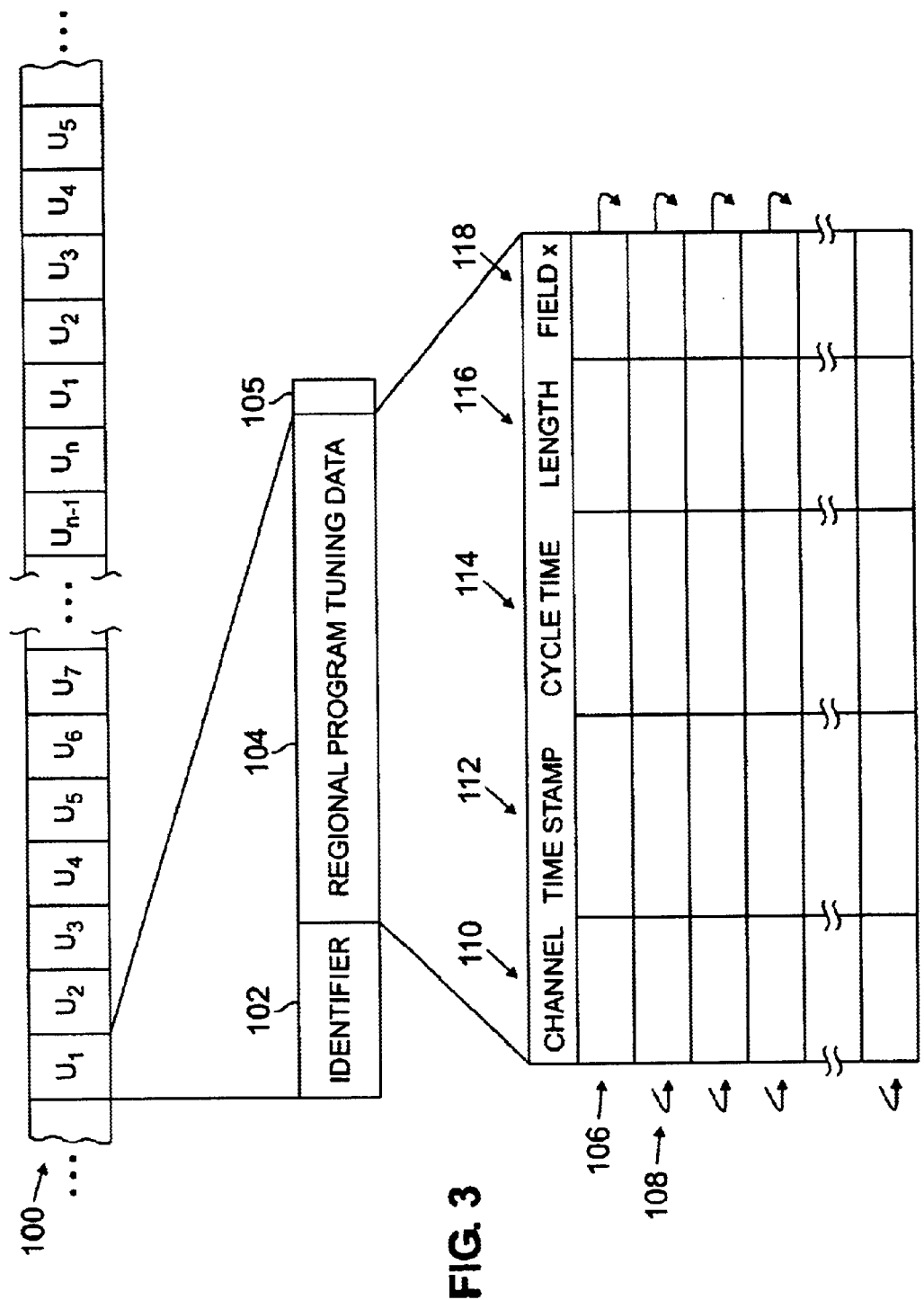
FIG. 3 is a diagram showing a first index signal structure.

FIG. 3 is a diagram showing the data structure of an embodiment of index data signal 34 (FIG. 1). As depicted, index data 100 includes a series of user data frames $U_1$–$U_n$. Frame $U_1$ contains index data for user 1; frame $U_2$, index data for user 2; etc. Each unique user data frame $U_1$–$U_n$ includes the identifier for the particular system user's receiver. The index data in frame $U_1$ contains the identifier for user 1's receiver; index data in frame $U_2$, the identifier for user 2's receiver; etc. As shown, for example, data frame $U_1$ includes identifier 102.

Index data is continuously and repeatedly broadcast over the entire system area. In some embodiments the index channel data is broadcast on a single channel. In other embodiments the index channel data is broadcast on more than one channel to reduce the time between broadcast repetitions or to accommodate additional users. The maximum time between index channel updates is the time between updates of program channel contents. If, for example, program channel contents are updated every 24 hours, the maximum time between index data repeat broadcasts is also 24 hours. In practice, however, the index data should be broadcast more frequently than the program data to allow for times when the receiver is tuned to download a particular program, or when the receiver is in a location that blocks index signal propagation.

The number of user data frames that can be broadcast depends on the index data bandwidth capacity allocated per user, as well as the time between repeat broadcasts of the user data. For example, for a 192 Kbps bandwidth, 1 Kbyte index data per person, and 24-hour index data frame repetition, approximately two million unique identifiers (i.e., users) can be serviced.

Receiver 40 tunes to the channel specified in the information stored and associated with the receiver's identifier. Using synchronization provided by clock 74, the tuning occurs just before the time associated with the receiver's identifier. Receiver 40 then continuously monitors the index channel data for its associated identifier. That is, the index data for the receiver is broadcast at a set time, predetermined by the receiver's identifier, and the receiver tunes to receive its index data just prior to that set time. Receiver 40 is alerted that tuning data 104 follows on signal 34 when it detects its identifier 102. Receiver 40 then downloads tuning data 104, stores the tuning data in memory 68 (FIG. 2), and uses the tuning data to receive information the user requested in user profile data 16 (FIG. 1). Tuning data 104 may vary among geographic system regions. Due to broadcast spectrum requirements, a certain program may be broadcast on one channel in system geographic region A and on another channel in region B. When the user is in region A, the user's receiver downloads tuning information for receiving the program in region A. In some embodiments as the user moves to region B, the user's receiver then downloads tuning information for receiving the program in region B.

Receiver location may be determined in various ways. In one embodiment the user contacts the service provider and informs the provider of an intended move into a new area. The provider responds with new tuning information in the index data for the user to use in their receiver. In another embodiment the receiver unit determines geographic location using a signal comparison method (e.g., signal comparison methods used during digital audio broadcasts in Europe in which the receiver unit is configured to select the stronger of two overlapping signals). Based on the signal comparison, the receiver unit tunes to the appropriate program signal as provided in the index signal tuning data.

Additional information 105 between user data frames may contain conventional time synchronization information so that the receiver can quickly synchronize to system time.

As shown, program tuning data 104 includes one or more subframes. Each subframe contains the tuning data necessary to receive one preselected program. For example, tuning data for one program is contained in subframe 106 and tuning data for a second program is contained in subframe 108. The number of subframes is fixed to preserve index signal synchronization, and the number of subframes containing information depends on the number of programs the user has selected. In some embodiments in which the user selects more programs than exist available subframes, a second index frame is provided for the user at a different time.

Each subframe includes channel field 110, time stamp field 112, cycle time field 114, and length field 116. Channel field 110 contains the channel to which receiver 40 must tune so as to access the requested program in program data signal 36. Time stamp field 112 contains the time at which receiver 40 must tune to the associated program channel in channel field 110 so as to access the requested program.

In some embodiments there is a "cycle time" and a "length" field included. Cycle time indicates when a single or divided program (explained below) may be received next. Length indicates program data size so that the receiver may decide whether to download the program data (for example, if memory capacity is limited).

In some embodiments the user identifier is used as the decryption key. Thus in such embodiments it is impossible for other receivers to receive index data encrypted for a particular user identifier. Index data may contain personalized data in some embodiments.

Field x 118 includes the category number associated with program data. The category number identifies the particular program after it is downloaded and stored in the receiver's memory, thereby allowing the logic unit to identify and access the stored program when the user selects the program for output.

The following example illustrates operation. The example system offers many programs. Among the programs are jazz music program 0123 and yesterday's baseball scores program 0456. The jazz program is broadcast on channel 030 at 00:00:25 and the sports program is broadcast on channel 032 at 00:01:08. User 1, assigned identifier 001, preselects these two programs (profile data 22, FIG. 1). User 1's receiver monitors the index signal at a time just prior to the time user 1's tuning information is broadcast. When user 1's receiver detects "001" in the user identifier field, the receiver downloads the tuning data that follows. This tuning data instructs the receiver to tune to channel 030 at 00:00:25 and download the information (the jazz program). The tuning data further instructs the receiver to tune to channel 032 at 00:01:08 and download the information (the baseball scores). The downloaded programs are stored in memory 68 and output as the user selects. If the user was in a different geographic region, the tuning information may be different because the program channels and program times may be different in the other region.

FIG. 4A is a diagram showing data structures of program data signal 36 in accordance with the present invention. As shown, program information 120 for programs is broadcast in a repeating string 122 of frames $P_1$–$P_n$. As shown, frame $P_1$ is rebroadcast immediately following frame $P_n$. For the embodiment shown, program 1 information is broadcast in frame $P_1$, program 2 information is broadcast in frame $P_2$, etc. Each of frames $P_1$–$P_n$ in string 122 may have equal or unequal length, depending on program content.

The program data broadcast is time synchronized. As shown, string 122 is broadcast beginning at a reference time $t_{REF}$. Accordingly, each frame $P_1$–$P_n$ is broadcast and rebroadcast at a known time because the length of each frame $P_1$–$P_n$ is known. The receiver is synchronized to receive the next program data using information from the index data signal, including cycle time. Receiver 40 uses the regional program tuning data to tune to the program channel at the correct time to receive the program, e.g., program $P_2$.

Program data frames are not always broadcast in strict sequence. For example, in some embodiments one or more frames are interleaved at a higher repetition rate among other frames. FIG. 4B illustrates one such embodiment. As depicted, program data frame $P_1$ is inserted as every fourth frame. Setting up such a limit in frames can reduce the buffer memory size required in the receiver. And, such interleaving allows some programs (e.g., news, sports) to be more frequently updated than other programs (e.g., music).

Figure 4C:
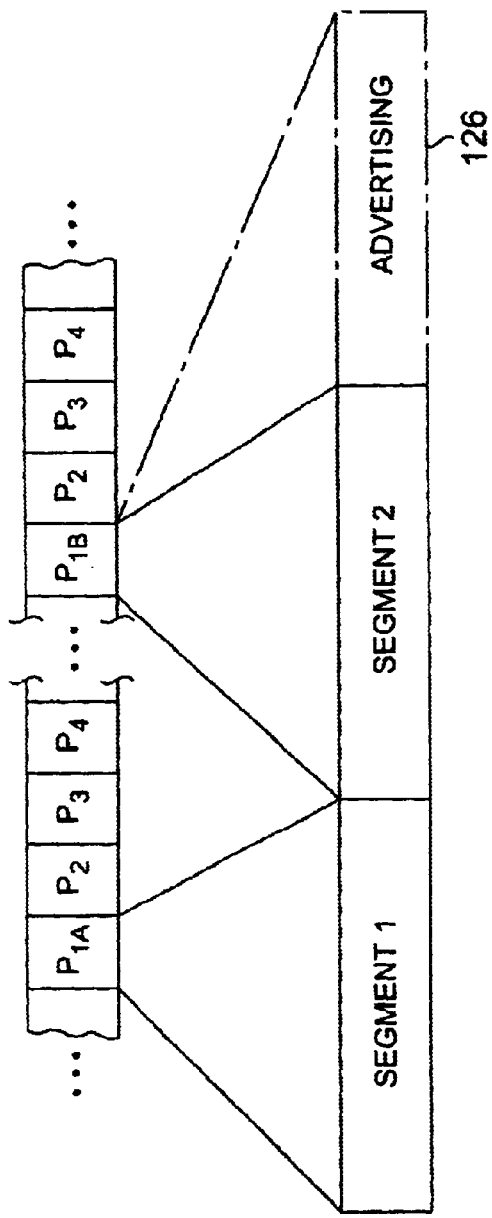

Furthermore, in some embodiments long programs such as video are broadcast as two or more frames (e.g., packetized) and interleaved among other program data frames. As shown in FIG. 4C, for example, program $P_1$ is broken into two parts and broadcast as frames containing segment $P_{1A}$ and segment $P_{1B}$. Receiver 40 concatenates segments $P_{1A}$ and $P_{1B}$ to reconstruct the full program $P_1$. This structure allows more flexibility than strict fixed time program data structures.

Some embodiments insert additional information into the program data frames. For example, advertising that targets users who select a certain program may be added to the program data frame containing that certain program. FIG. 4C illustrates optional advertising information 126 included in frame $P_{1B}$. In this optional embodiment the user receives advertising information after receiving the program information. Advertising information may be inserted anywhere within, for instance, program $P_1$ as well as in other parts of program data signal 36, such as single program data frame 124 (FIG. 4A). This advertising may be based on user profile information stored in database 15 (FIG. 1).

Figure 9:
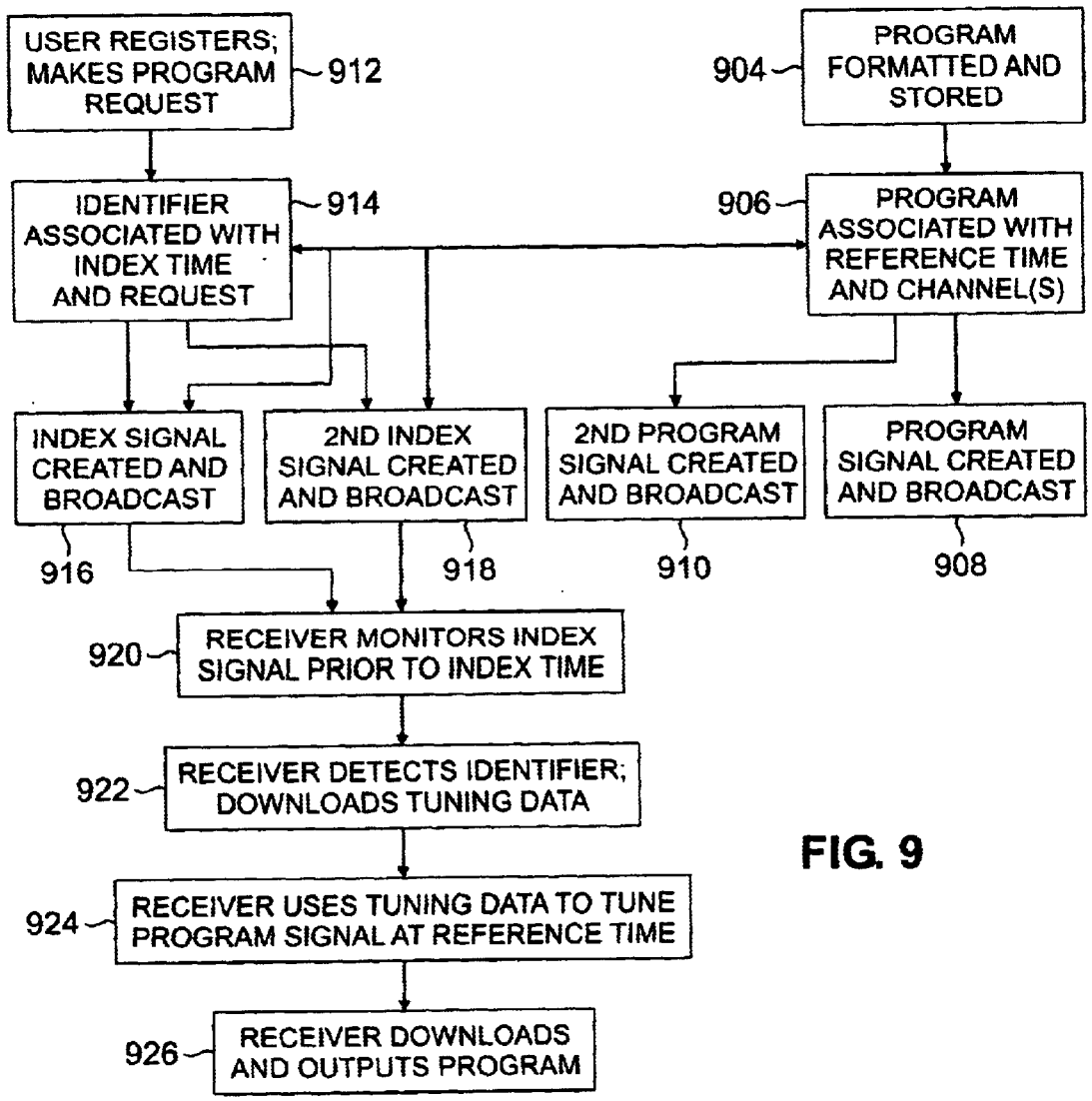
FIG. 9 is a flow diagram illustrating a push system process.

FIG. 9 is a flow diagram illustrating a "push" system process. In 904 one or more programs are formatted for storage and eventual broadcast. In 906 the formatted program is associated with a particular reference time at which the program will be broadcast, and in 908 the program signal is broadcast so that the program starts at the reference time. In 910 an optional second program signal is broadcast, for example in another geographic area, and also contains the program. The second program signal may be on the same or a different channel than the 908 program signal, and the 910 program may start at the same or a different time as the 908 program signal.

In 912 the user registers his or her receiver identifier with the system and makes program requests as described above. In 908 the identifier for the user is associated with the time at which the user's index data will be broadcast. The identifier is also associated with one or more programs the user requested in 912, so that the program channel and broadcast time for each unique requested program is incorporated in the index data for the user. In 916 the index signal is created and broadcast, and in 918 an optional second index signal, used for example in the second geographic area, is also created and broadcast.

In 920 the user's receiver tunes to the index channel just before its assigned index data broadcast time and monitors for its identifier. Upon detecting its identifier in 922, the receiver downloads the tuning data required to tune and receive the user's requested program as broadcast in 908 or 910. Finally, in 924 the user's receiver uses the tuning data to tune to the program signal at the reference time at which the program is broadcast, and then downloads and outputs the program to the user as shown in 926.

Since broadcast systems efficiently send programs to a large number of users over a wide geographic area, it is generally impractical (although within the scope of this invention) to include personalized information for individual users. Another limitation is that this "push" embodiment can include information such as an order form for a commercial purchase, but the user cannot use the system to place his or her order on-line.

Push-Pull System

FIG. 5 is a block diagram illustrating a second embodiment as system 200. As shown, service center 202 includes conventional user profile database memory 204 storing profile database 205, program database 16 stored in memory 17, mixer 18, and conventional user index data memory 206 storing user index data 207.

Also shown is user profile data 22 that is input to user profile database 205, and program formatter 28 that inputs program data to program database 16. As described above, in some embodiments program data in database 16 is divided into categories such as global programs 26A, restricted programs 26B, personal programs 26C, and advertising programs 26D, described above. Database 16 also contains broadcast information 27.

User profile database memory 205 contains information that is similar to information in database 15 (FIG. 1). However, as described below, in addition to preselecting a program by inputting profile data 22, the user may select in real time a program to receive.

Information from user profile database 204 and program database 16 is associated using mixer 18 to create user index data 207 stored in memory 206. User index data stored in memory 206 is similar to the information stored in memory 31 (FIG. 1).

Information from program database 16 is output to one or more transmission stations. As shown, transmission station 208A is located in system 200's geographic region A and transmission station 208B is located in geographic region B. Other embodiments include more transmission stations to provide, for example, nation-wide coverage. The geographic regions are defined by the reliable broadcast signal coverage of each transmission station. The transmission stations broadcast program data signal 36 as described above. Program data signal 36 may be relayed as signal 36a using, for example, satellite 35. In some push-pull embodiments the transmission stations do not broadcast an index signal. In other embodiments the transmission stations broadcast the index signal (e.g., similar to European DAB) or relay an index signal from a central source (e.g., similar to hybrid satellite and terrestrial radio system in XM satellite radio).

Information system 200 also includes personal transceiver 220 carried by each system user. Personal transceiver 220 components are described in detail below. As a receiver, personal transceiver 220 operates similarly to receiver 40 described above. Personal transceiver 220 tunes to an index data signal, and then downloads and stores index data. The index data is then used to tune to a program data signal and download the user's requested programs. In this embodiment transceiver 220 downloads index data that is broadcast by wireless communications system 230.

FIG. 5 shows conventional wireless (radio) communications system 230 (e.g., conventional cellular telephone system, conventional two-way paging system) coupled to user index data memory 206 and to user profile database memory 204. As shown, wireless system 230 transmits user index data 207 from memory 206 as index signal 232. Transceiver 220 receives index signal 232 and downloads tuning information used to receive the user's requested programs from program data signal 36.

Transceiver 220 allows the user to request a program in real or near real time. The transceiver has a conventional display indicator that indicates to the user that playback of a program is possible. In some embodiments the index data contains information that is tailored to the individual user and provides recommended programs (e.g., based on similar programs selected in the user's personal profile data, or programs recommended to all users). In some embodiments new program choices are transmitted in the user's index data and are presented to the user as a display on the transceiver's user interface. In other embodiments, new program choices may be sent as program information to be output to the user.

The user selects a program using transceiver 220 by making a selection from the one or more displayed menus. In turn, the transceiver sends the program request on request data signal 234. Wireless system 230 receives the program request and then sends via line 236 the request to user profile database 205. Line 236 illustrates that any conventional communications link may be used. Once the new program request reaches database 205, the user's profile database information is updated. Mixer 18 then associates the updated user profile data and the program data from program database 16 to update user index data 207. In turn, the updated user index data for the particular user is sent to wireless system 230 which broadcasts new index data to transceiver 220. Transceiver 220 uses the new index data to tune and download the user's requested program from program data signal 36. The wireless system continuously broadcasts the index data signal over one or more dedicated channels. When the receiver downloads a particular program it sets an audio and/or visual indication that a new program has arrived. The user may then review the downloaded program and output, store, or delete the program as desired.

Figure 6:
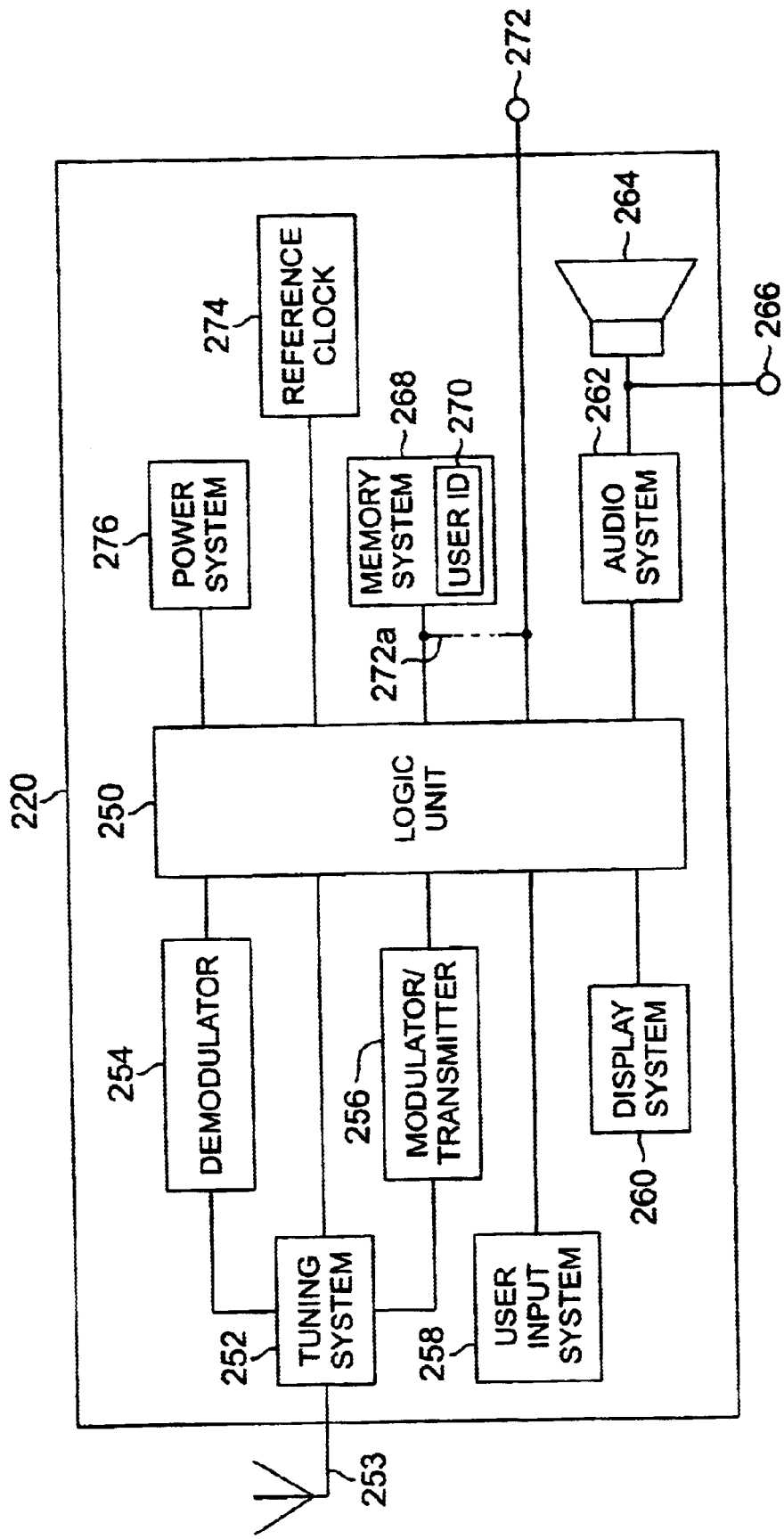
FIG. 6 is a block diagram showing major systems of a combined receiver and transmitter.

FIG. 6 is a block diagram showing components of personal transceiver 220. Personal transceiver 220 is made small and light enough to be easily portable. Persons skilled in the art will understand detailed operation of the individual components depicted.

Logic unit 250 includes a conventional microprocessor/microcontroller that processes and directs information flow within transceiver 220 in accordance with coded instructions (e.g., software stored in memory). Tuning system 252 is electrically coupled with both conventional antenna 253 and logic unit 250 and tunes to receive program data signal 224 and index data signal 228 as directed. Tuning system 252 contains at least one conventional tuner configured to tune the transmitted index signal, and a second conventional tuner configured to tune the wireless system signal. Demodulator 254 and modulator/transmitter 256 are electrically coupled with both logic unit 250 and tuning system 252. Demodulator 254 extracts program data or index data from a received signal for processing by logic unit 250. In some embodiments demodulator 254 includes decryption capability to decode restricted program information. Modulator/transmitter 256 encodes and transmits as user data signal 232 (FIG. 5) the user's program request information.

Personal transceiver 226 includes user input system 258, conventional display system 260, and conventional audio system 262, each electrically coupled to the logic unit. Input system 258 allows the user to select a program and includes, for example, a conventional data entry keypad. Display system 260 includes, for example, conventional liquid crystal or thin film transistor display technology and displays the video portion of a program to the user. Display system 260 also displays program menu choices the user selects by using input system 258. Audio system 262 outputs the audio portion of a program to the user through, for example, speaker 264. In some embodiments the audio portion is also output through headphone terminal 266.

Conventional memory system 268 is coupled with logic unit 250 and includes both conventional nonvolatile and volatile portions (not shown). During operation, memory system 268 contains information extracted from program data signal 224 and index data signal 228. Memory system 268 has other hard- and soft-coded information sufficient to operated transceiver 226 as described here. Such coding is well within the capability of skilled programmers. Memory 268 also includes portion 270 in which the unique unit identifier is stored. In some push-pull embodiments a wireless telephone number may be used as the identifier. On initial manufacturing or sale the identifier is input to memory 268 using, for example, a signal input through terminal 272. Line 272a couples terminal 272 with memory 268, illustrating that direct memory access (DMA) is provided in some embodiments.

Conventional reference clock 274 is electrically coupled with logic unit 250 and provides reference timing transceiver 226 uses to receive program data signal 224. Reference clock 274 receives an initial system time synchronization signal through terminal 272. In some embodiments reference clock 274 receives an updating system time synchronization signal from either program data signal 224 or index data signal 228.

Conventional power system 276 includes a regulated electrical power source, e.g., a battery, and provides sufficient power to operate transceiver 226.

Program storage prioritization may be as described above for the "push" embodiment receiver.

Some embodiments of the push-pull system allow the user to transmit information to other system users, or outside the system. For example, in some embodiments the user may transmit at least a portion (e.g., for a particular music program) of his or her index data to another system user. In some embodiments the user may have email capability. Index data and email information do not require the bandwidth necessary for voice transmission, and hence may be done using, for example, frequencies for a conventional two-way paging system.

In this "push-pull" embodiment program information is structured essentially as discussed above in relation to FIGS. 4A, 4B, and 4C. However, the index data signal may contain personalized information that is not continually broadcast. The personalized information is multiplexed with the index data signal frames so that users receive both index data and programs customized for their personal real time choices. Email or index data from another system user are illustrative of such personalized information.

Figure 7:
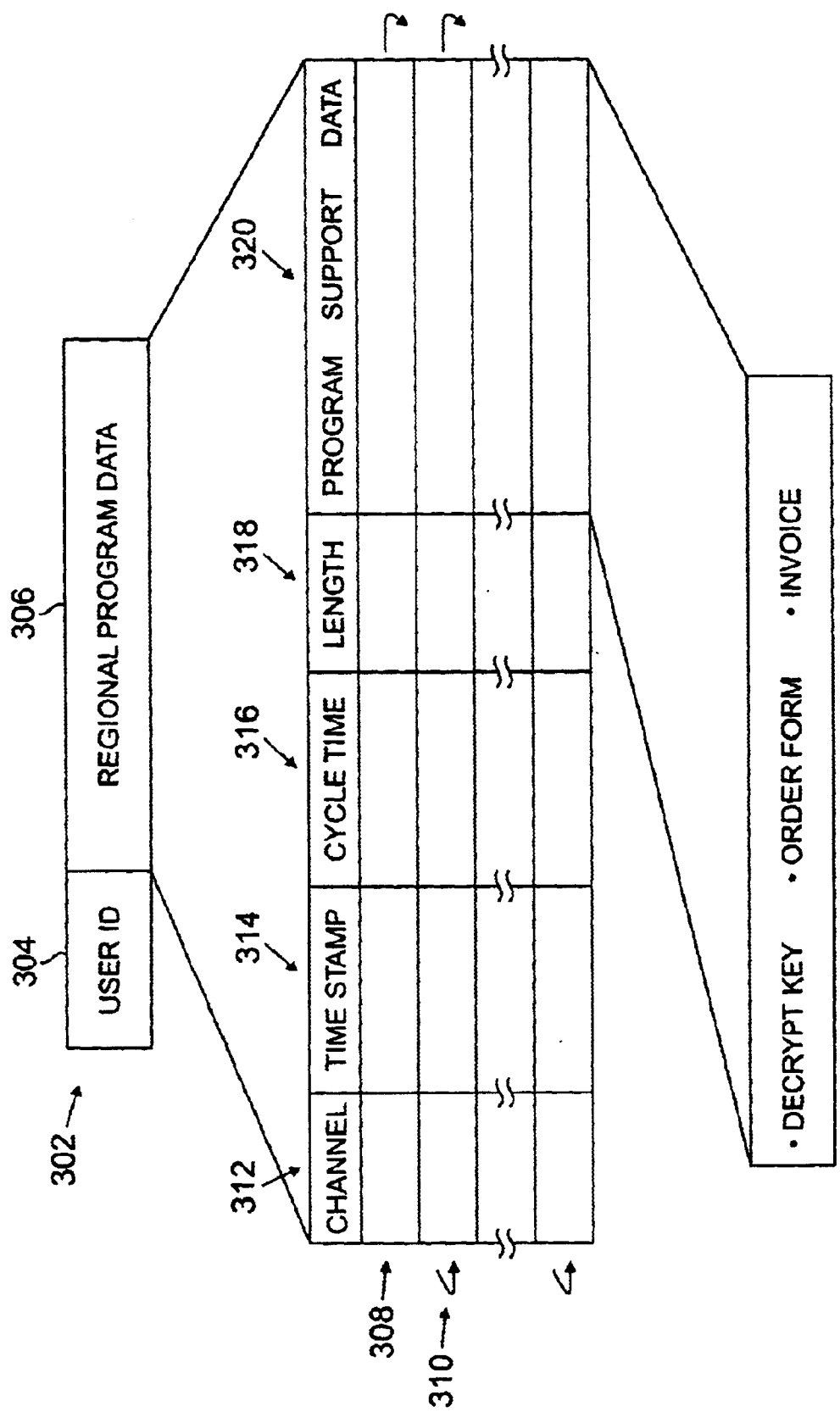
FIG. 7 is a diagram showing a second index signal structure.

FIG. 7 is a diagram showing the structure of an embodiment of index data signal 232 broadcast by wireless system 230 (FIG. 5). Frame 302 is one of a string of user index data frames in signal 232. Frame 302 contains user identifier header 304 followed by regional program data 306. Program data 306 is divided into one or more subframes (shown wrapped, each subframe following the one immediately preceding). Each subframe includes regional tuning data that allows transceiver 220 to properly tune and download one of the user's requested programs. For example, subframe 308 includes tuning data for one requested program and subframe 310 includes tuning data for another requested program.

The subframes are further divided into fields. Each subframe has channel field 312, time stamp field 314, cycle time field 316, and length field 318. In addition, some subframes may have one or more program support data fields 320. The information in each program support data field 320 may vary for each program. For example, if the user requests a restricted program, the necessary decrypt key may be sent as program support data. Or, if the user requests music concert information, the program support data may include an order form with which the user may order tickets. For user requests that require an additional fee be paid, the necessary electronic invoice may be included in the program support data. The index number is not required.

Figure 8:
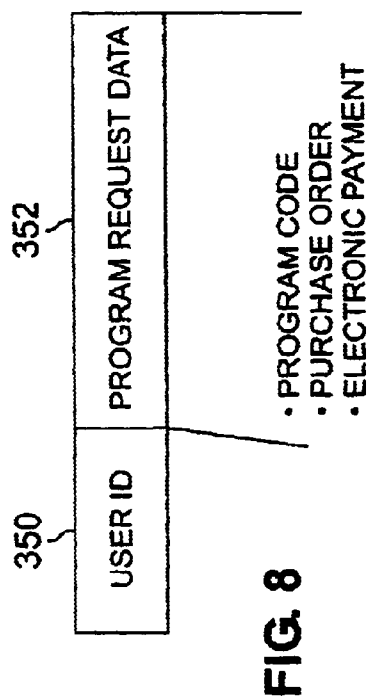
FIG. 8 is a diagram showing user request data signal structure.

FIG. 8 is a diagram showing the structure of user request data signal 234. As shown, request signal 234 includes user identifier frame 350 that contains the user's identifier. Request signal 234 also includes program request frame 352 that contains information identifying such as the code for the program to which the user requests access, a purchase order for tickets, or electronic fee payment. The code used to order is already sent in program support data 320 in index data 302. Users will confirm contents of downloaded program data based on this information and then will order.

Figure 10:
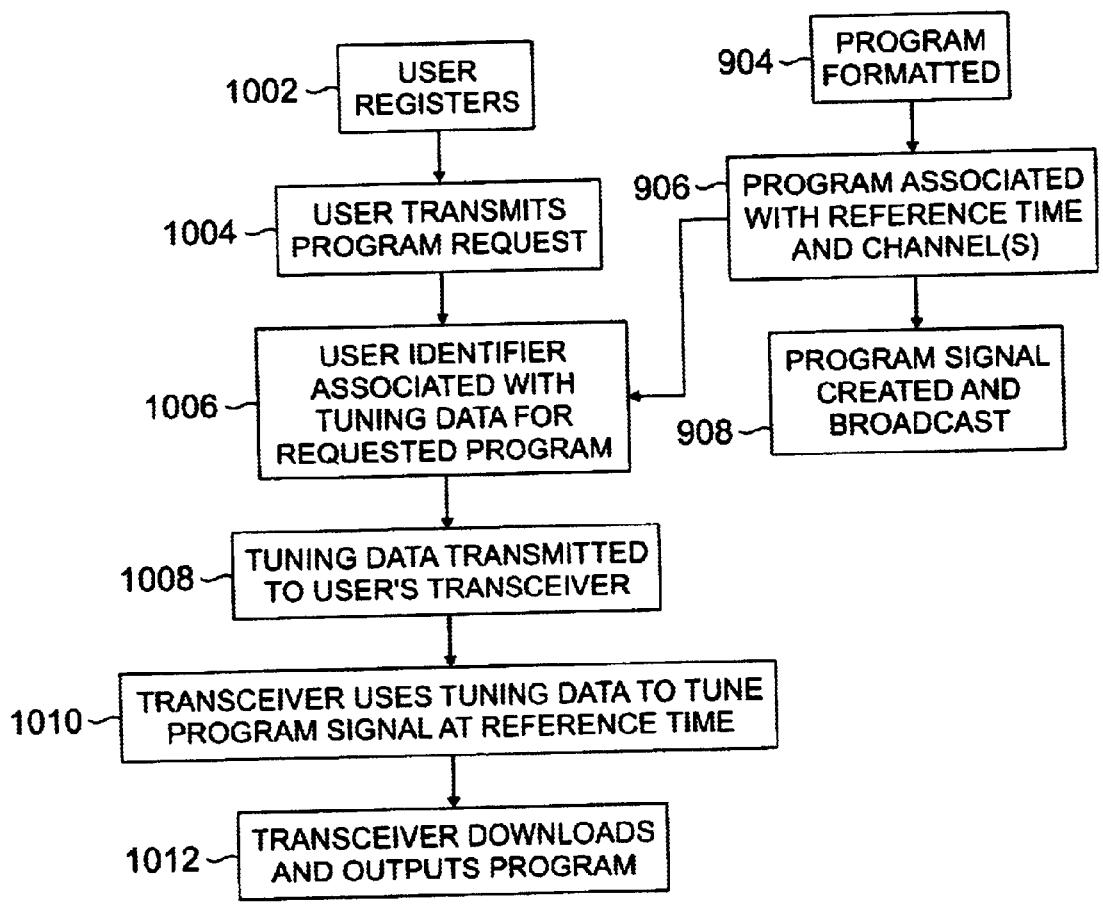
FIG. 10 is a flow diagram illustrating a push-pull system process.

FIG. 10 is a flow diagram illustrating a "push-pull" process. The program signal is created and broadcast as described for 904, 906, and 908 in FIG. 9. In 1002 the user registers his or her transceiver and in 1004 the user transmits a request for a particular program to the service center. In the service center, the user's identifier is associated with the tuning data for the requested program, shown in 1006. In 1008 the tuning data is transmitted to the user's transceiver which then uses the received tuning data to tune to the program signal at the appropriate time shown in 1010, and to download and output the program as shown in 1012.

The present invention has been described in terms of specific embodiments. Persons skilled in the field will understand, however, that the present invention exists in many variations. In addition, persons skilled in programming and in communications systems will understand in light of this disclosure how to construct, format, organize, and manage user and program information and the associated systems as described above. The invention is therefore limited only by the following claims.

I claim:

1. An information system comprising:

one or more transmitters configured to broadcast a program signal and an index signal, wherein the program signal includes a program beginning at a predetermined time, wherein the index signal includes an identifier and tuning data associated with the identifier, and wherein the tuning data identifies a channel over which the program signal is broadcast and the predetermined time; and a receiver having a logic unit, a tuning system coupled to the logic unit, and a memory in which data representing the identifier is stored coupled to the logic unit, wherein the receiver is configured to monitor the index signal, to download and store the tuning data upon detecting the identifier in the index signal, and to use the stored tuning data to receive the program.

2. The system of claim 1 wherein either or both the index signal and the program signal include data representing new programs and/or updates to programs broadcast on the program signal.

3. The system of claim 1, wherein the system is configured to broadcast first tuning data that enables the receiver to receive a first program signal in a first geographic coverage area, and to broadcast second tuning data that enables the receiver to receive a second program signal in a second geographic coverage area.

4. The system of claim 1 wherein a tuning time is associated with the identifier, and the receiver is configured to operate in at least a first state during which the receiver monitors the index signal just prior to the tuning time, and a second state during which the receiver does not monitor the index signal.

5. The system of claim 1 wherein the index signal is relayed through a satellite.

6. A method of transmitting information comprising the acts of:

broadcasting a program signal including a program beginning at a reference time;

broadcasting an index signal, wherein the index signal includes an identifier associated with both the reference time and tuning information;

receiving the index signal, and thereafter detecting the identifier in the index signal and subsequently storing in a memory the reference time and tuning information from the index signal;

using the stored reference time and tuning information to receive the program signal at the reference time; and downloading and storing in the memory the program.

7. The method of claim 6 wherein the index and program signals are high speed digital signals.

8. The method of claim 6 further comprising:

broadcasting first tuning data that enables the receiver to receive a first program signal in a first geographic coverage area; and broadcasting second tuning data that enables the receiver to receive a second program signal in a second geographic coverage area.

9. The method of claim 6 further comprising:

associating a tuning time with the identifier;

operating the receiver in a first state during which the receiver monitors the index signal just prior to the tuning time; and operating the receiver in at least a second state during which the receiver does not monitor the index signal.

10. An information system comprising:

a transmitter configured to broadcast a program signal that includes a program beginning at a predetermined time;

a wireless communication system configured to broadcast an index signal that includes an identifier and tuning data associated with the identifier, wherein the tuning data identifies a channel over which the program signal is broadcast and the predetermined time; and a transceiver having a logic unit, a tuning system coupled to the logic unit, and memory in which data representing the identifier is stored coupled to the logic unit, wherein the transceiver is configured to monitor the index signal, to download from the index signal and store in the memory the tuning data upon detecting the identifier, and to use the stored tuning data to receive the program information.

11. The system of claim 10 further comprising:

a service center coupled to the transmitter and to the wireless system; and the transceiver includes a modulator/transmitter coupled to the logic unit;

wherein the transceiver is configured to transmit a request, associated with the identifier, for a selected program;

wherein the wireless communications system is configured to receive and relay the request to the service center;

wherein the service center is configured to associate the identifier with selected tuning data for the selected program upon receiving the request, to modify the index signal to contain the selected tuning data associated with the identifier, and to relay the selected tuning data to the wireless communication system;

wherein the wireless communication system is further configured to transmit the index signal including the selected tuning data; and wherein the transceiver is configured to download the selected tuning data upon detecting the identifier, and to use the selected tuning data to receive the selected program.

12. The system of claim 11 wherein either or both the index signal and the program signal include data, representing new programs and/or updates to programs broadcast on the program signal, used to present on a display a menu of program choices to a user.

13. The system of claim 11 wherein the selected program includes an entertainment program.

14. The system of claim 12 wherein the selected program includes an order form.

15. The system of claim 12 wherein the selected program includes an invoice.

16. The system of claim 12 wherein the request includes a payment by the user.

17. The system of claim 12 wherein the service center is configured to modify the program signal to contain the selected program upon receiving the request, and to relay the modified program signal to the transmitter for broadcast.

18. The system of claim 17 wherein the selected program includes electronic mail.

19. The system of claim 17 wherein the index signal includes electronic mail.

20. The system of claim 10 wherein the transceiver is configured to transmit selected index data to a second transceiver.

21. A method of transmitting information comprising the acts of:

broadcasting a program signal including a program beginning at a reference time;

associating an identifier with a mobile transceiver;

transmitting a request, associated with the identifier, to receive the program;

receiving the request and associating the identifier with tuning data for the program;

modifying index data to contain the tuning data and the identifier;

transmitting the index data;

detecting the identifier in the index data and subsequently downloading and storing in a memory of the transceiver the tuning data; and using the stored tuning data to receive the program.

22. The method of claim 21 wherein the acts of receiving the request and transmitting the index signal are at least in part accomplished using a wireless communications system.

23. The method of claim 21 further comprising the act of presenting a menu of program choices to a user by using data in the index signal.

24. The method of claim 21 further comprising the act of presenting a menu of program choices to a user by using data in the program signal.

25. The method of claim 21 wherein the program includes an order form.

26. The method of claim 21 wherein the program includes an invoice.

27. The method of claim 21 wherein the request includes a payment by the user.

28. The method of claim 21 further comprising the act of modifying the program signal to contain the program upon receiving the request.

29. The method of claim 21 further comprising the act of transmitting selected index data stored in the memory of the transceiver to a second transceiver.

* * * * *